June 13, 1944.  W. P. THOMAS  2,351,162

GAUGE GLASS

Filed Nov. 28, 1941

INVENTOR.
Willis P. Thomas
BY
ATTORNEY.

Patented June 13, 1944

2,351,162

UNITED STATES PATENT OFFICE 2,351,162

GAUGE GLASS

Willis P. Thomas, Highland Park, Mich., assignor to Diamond Power Specialty Corporation, Detroit, Mich., a corporation of Michigan Application November 28, 1941, Serial No. 420,755

6 Claims. (Cl. 73—330)

This invention relates to gauges and particularly to the glasses therefor, and has for its object to provide a glass composed of multiple parts which will be of universal use and more economical both from the standpoint of original cost and maintenance.

In gauges of this type connected to high pressure boilers there are frequently extreme changes in temperature, as when a gauge is blown down and the glass is contacted throughout its length by the live steam. The glasses are quite thick and heavy strains are set up since one side thereof is heated very fast and the other, due to the poor conductivity of glass remains close to its original temperature. Fractures often result. An object of this invention is to provide a glass composed of a plurality of sections which may be stacked in a series to form a complete gauge glass in order to moderate the stresses of this type, by a discontinuity of the structure and the opportunity to insert gaskets between the parts thereof.

Another advantage from a multi-sectional glass is that any sections which become broken may be replaced without replacing the entire lot.

A further advantage is that the glass may be made of any desired length simply by adding sections between the end pieces. The usual stock of glasses of all sizes used in a given establishment may thus be eliminated in favor of a stock of sections and end pieces.

Another object is to provide a composite glass which will inherently show regular divisions of the vertical height thereof so that neither etched divisions on the glass nor markings on the metallic parts adjacent thereto will be necessary.

Another object is to provide a gauge glass composed of a plurality of horizontal sections having gasket means therebetween to avoid glass to glass contact, the sections being in rather loose assembly, in combination with leak proof means of a transparent character, such as a mica sheet, between the water and the glass and sealed at its outer edges.

Other objects and advantages will become more fully apparent as reference is had to the accompanying drawing wherein my invention is illustrated, and in which.

Figure 5:
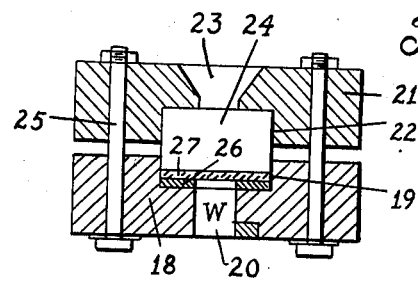
Fig. 5 is a partial view similar to Fig. 4 showing a modified form of installation of my invention.
Figure 4:
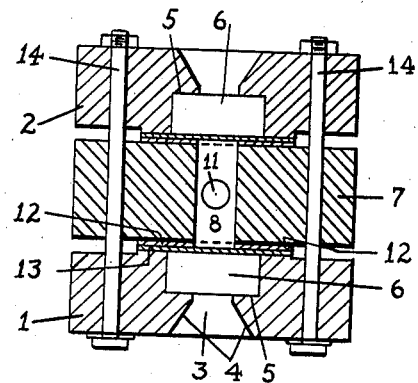
Fig. 4 is a horizontal section taken along the line 4—4 of Fig. 1.
Figure 1:
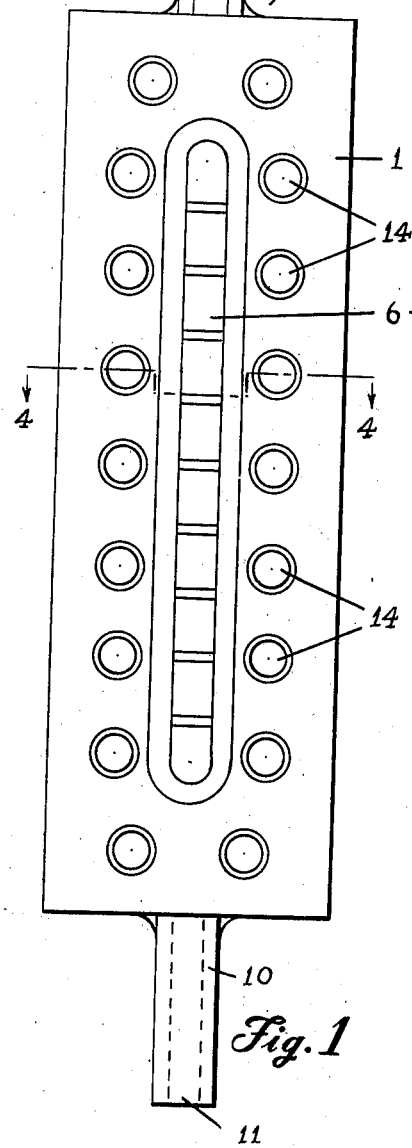
Fig. 1 is a front or back elevation of a gauge equipped with my improved gauge glass.
Figures 2, 3:
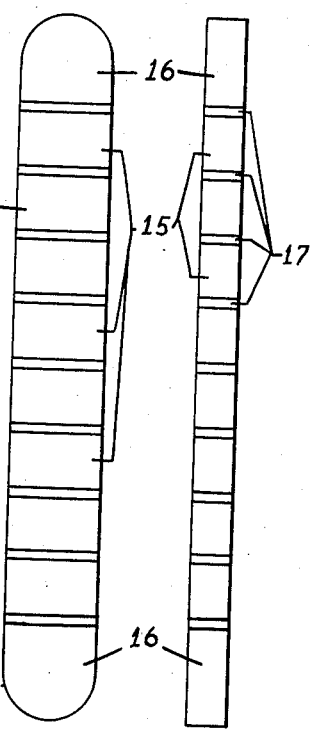
Fig. 2 is a front or back elevation of the composite glass removed from the gauge.
Fig. 3 is a side elevation of the showing in Fig. 2.

More particularly, 1 and 2 indicate the front and back plates, respectively, of a gauge. These plates may be identical or substantially so. Each has an elongated slot 3 having rounded ends and inwardly converging sidewalls 4 which terminate at a recess 5 and which receives a glass 6. Separating the plates 1 is a central member 7 which has an elongated slot 8 cut therethrough which is rectangular in cross-section and of a shape similar to that of the vision space of the slots. Fixedly secured, as by welding, to the top and bottom of the member 7 are the tubes 9 and 10 for connection to a boiler (not shown). These tubes have passageways 11 therethrough which are open to the interior of the slot 8 so that water and steam may be seen through the glass 6 at their relative boiler levels. On each side of the center plate 7 there is an asbestos gasket 12 and a transparent mica sheet 13, both of these encircling the entire periphery of the glass and being firmly clamped in place by the bolts 14, a multiplicity of which are provided to prevent leakage past the mica. The gasket 12 extends from a region outwardly of the outer edge of the glass inwardly to the vision opening whereas the mica sheet 13 is substantially co-extensive with the gasket 12 in overall dimensions and forms a complete covering for the glass sections, the essential requirement being that they be of sufficient area to be clamped either by the cover plate, as here shown or by the glass as illustrated in Fig. 5, hereinafter described.

The gauge glass 6 is a composite of a plurality of sections 15, here illustrated as horizontal, all of which may be of the same size and shape and, preferably, rectangular on each face, and two end sections 16 which have rounded outer ends. Other shapes may be found satisfactory, but whatever shape is chosen it is recommended that all middle sections be of the same size. The sections are each separated from adjacent sections by gaskets 17 which may be of asbestos or of other suitable material.

In Fig. 5 a different type of loose window construction is illustrated. In this case the gauge body 18 has a recess or groove 19 open at the mid portion of its base to the fluid compartment 20. The cover plate 21 has a recess 22 open longitudinally thereof to form a vision opening 23. The gauge glass 24 fits in the recesses 19 and 22 and when pressure is applied to the glass 24 by tightening the bolts 25 the glass pressures against the gasket 26 and the mica 27. The glass is made up of a plurality of pieces, as previously described, the mica and gasket being common to all sections. Here the mica and gasket have a contour equal to that of the glass because sealing pressure is imposed through the glass.

Although two specific embodiments of the invention have been illustrated and described, it will be understood that various changes may be made within the scope of the appended claims without departing from the spirit of the invention, and such changes are contemplated.

What I claim is:

1. A composite gauge glass comprising a plurality of vertically disposed sections arranged so that the top of one section lies in a horizontal plane parallel with and slightly spaced from a plane containing the bottom of an adjacent section, the top and bottom sections being rounded at their outer ends, the intermediate sections each having all sides thereof rectangular, each section being separated from its adjacent sections by common gaskets.

2. In a gauge, a front and back member each having an elongated slot therethrough, a center plate also having an elongated slot therethrough, said center plate having inlet and outlet lines leading from and to a boiler respectively, the walls of the slots of said front and back members each being recessed to receive a gauge glass, a gauge glass in each recess composed of a plurality of horizontal sections separated from each other by a packing means, a transparent seal covering both of said gauge glasses, and a gasket separating the edges of said seals and said center plate.

3. In a gauge, the combination of a multi-piece gauge glass the separate pieces of which are arranged in tandem and a transparent seal of uninterrupted surface completely overlying the inner side of all pieces of said glass, said seal being exposed on one side directly to the fluid in the gauge and being in direct contact with each piece of said multi-piece gauge glass and gasket means overlying the edge of said transparent seal.

4. A composite vertically disposed gauge glass of elongated shape comprising solid rounded end sections, solid intermediate sections disposed between said end sections each having the shape of a parallelopiped and common gaskets separating adjacent sections, all of said gaskets being disposed in substantially horizontal planes.

5. A composite vertically disposed gauge glass of elongated shape comprising solid rounded end sections, solid intermediate sections disposed between said end sections each of rectangular cross section and a gasket common to each two adjacent sections acting as the sole separating means therebetween, all of said gaskets being disposed in substantially horizontal planes and a transparent, heat-resistant covering over one side of all of said sections and said gaskets.

6. A composite gauge glass comprising a plurality of sections arranged in end to end relation and separated by gaskets, all of said sections having one face lying in a common plane, and a common seal overlying and in contact with all of said faces lying in said common plane, said common seal being adapted to be exposed directly to the fluid in the gauge in which the gauge glass is installed.

WILLIS P. THOMAS.